United States Patent [19]

Sorensen

[11] Patent Number: 5,129,150
[45] Date of Patent: Jul. 14, 1992

[54] GUIDE LINE SYSTEM FOR FACILITATING THE CONSTRUCTION OF A BRICK WALL

[76] Inventor: Gerry R. Sorensen, Rte. 1, Box 173-A, Chelan, Wash. 98816

[21] Appl. No.: 757,242

[22] Filed: Sep. 10, 1991

[51] Int. Cl.$^5$ .............................................. G01C 15/10
[52] U.S. Cl. ........................................ 33/408; 33/410
[58] Field of Search ................. 33/404, 406, 407, 408, 33/410

[56] References Cited

U.S. PATENT DOCUMENTS

| | | | |
|---|---|---|---|
| 441,492 | 11/1990 | Kelley | 33/410 |
| 2,585,160 | 2/1952 | Munn . | |
| 3,039,195 | 6/1962 | Litty . | |
| 3,177,980 | 4/1965 | Porter . | |
| 3,389,471 | 6/1968 | Blake . | |
| 4,031,627 | 6/1977 | Dar . | |
| 4,057,903 | 11/1977 | Cantera . | |
| 4,631,833 | 12/1986 | Moye | 33/408 |
| 4,689,889 | 9/1987 | Reeves . | |
| 4,937,946 | 7/1990 | Steinhoff . | |

FOREIGN PATENT DOCUMENTS 1296913 5/1962 France ................... 33/404

Primary Examiner—Harry N. Haroian
Attorney, Agent, or Firm—Delbert J. Barnard

[57] ABSTRACT

A pair of brackets (B1, B2) are mounted on the outside corner of a brick wall, one above the other. Each bracket (B1, B2) includes a pair of arms (16, 18) and inwardly directed cleats (32, 34) on the arms (16, 18) which fit into vertical joints (J) between the bricks in a corner. The cleats (32, 34) are adjustable in position along the arms (16, 18). Adjustment bolts (50, 52) are rotated to move the cleats (32, 34) towards the arms (18, 16) to in that manner clamp the corner bricks (78, 80) between the cleats (32, 34) and the arms (18, 16). Each bracket (B1, B2) includes a pair of pole sockets (82, 84). A vertical string pole (10) is positioned within the pole sockets (82). A vertical string pole (12) is positioned within the vertical pole sockets (84). Set screws (94, 96, 98) and (100, 102, 104) are adjustable to plumb the string poles (10, 12) and secure them to the brackets (B1, B2). Strings (S) extend horizontally between string poles (12, 14) at opposite ends of the wall part (112). The string (S) is set to provide a guide to the bricklayer, for laying a new horizontal course of bricks onto the wall part (112).

13 Claims, 4 Drawing Sheets

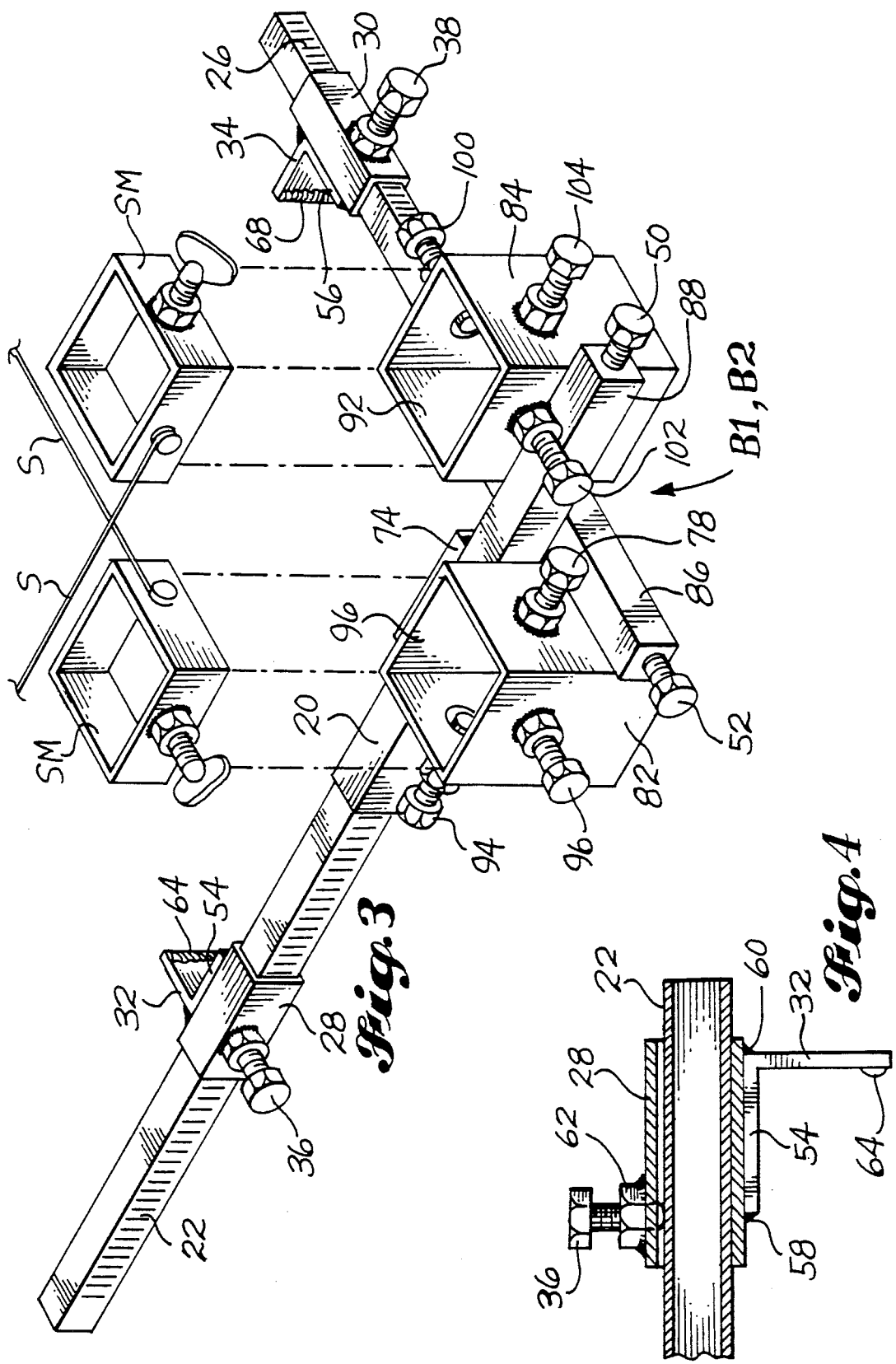

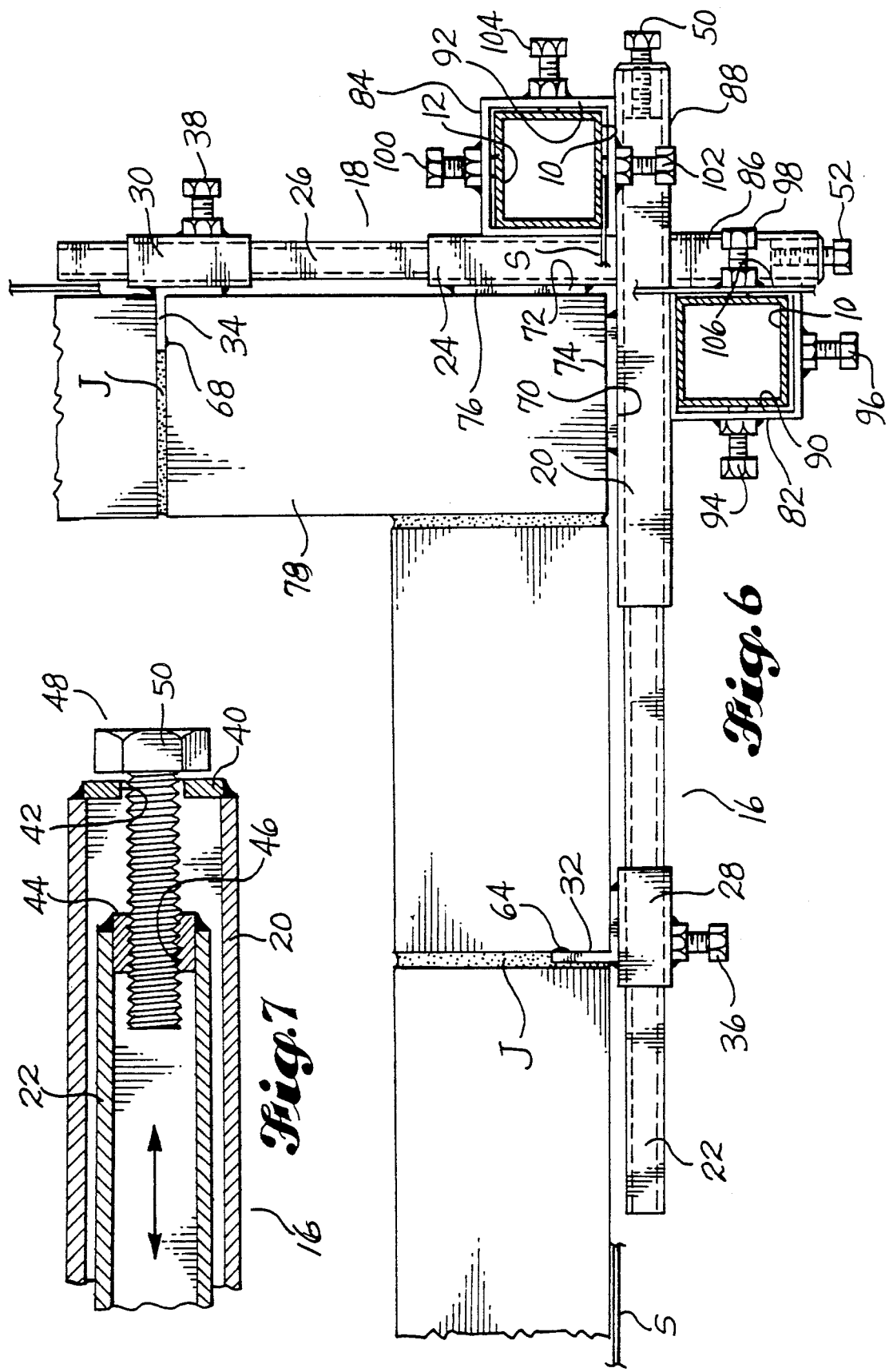

GUIDE LINE SYSTEM FOR FACILITATING THE CONSTRUCTION OF A BRICK WALL

TECHNICAL FIELD

This invention relates to improvements in guide line systems for facilitating the construction of brick walls. More particularly, it relates to the provision of an improved structure for supporting vertical string poles relative to a brick wall that is under construction.

BACKGROUND INFORMATION

U.S. Pat. No. 4,057,903, granted Nov. 15, 1977, to Pasquale Cantera discusses the prior art procedure of constructing brick walls by first constructing "leaders" at the ends of the wall and then filling in the courses of brick between the leaders. This patent, and U.S. Pat. No. 3,389,471, granted Jun. 25, 1968, to George T. Blake, and U.S. Pat. No. 4,689,889, granted Sep. 1, 1987 to Raymond A. Reeves propose the use of string support poles in place of the "leaders."

The present invention relates to improved apparatus for connecting string poles to end portions of brick walls, to facilitate the use of a string and poles for guiding the bricklayers as they construct the brick wall.

DISCLOSURE OF THE INVENTION

According to the invention, a pole support bracket is connectable to an outside corner portion of a brick wall that is under construction. The pole support bracket comprises an elongated first arm and an elongated second arm. Each arm has a corner end and a free end. The first and second arms are connected together at their corner ends and each arm extends perpendicular to the other arm. Each arm includes a perpendicularly inwardly extending cleat. Each cleat is sized and positioned to enter into a vertical joint between two bricks when the bracket is positioned with its arms substantially horizontal and against an outside corner portion of the brick wall. A first means is provided for pulling the first cleat relatively towards the second arm. A second means is provided for pulling the second cleat relatively towards the first arm. This movement of the cleats serves to clamp the bracket onto bricks at the corner which are positioned between the arms and the cleats. The bracket includes a vertically oriented pole socket positioned outwardly adjacent the second arm, at its corner end. The pole socket is connected to the second arm. An elongated vertical pole is positioned within the pole socket. The pole has a side surface which is substantially coplanar with the outside surface of the brick wall. In use, a string is placed against the side surface to extend horizontally and serve as a guide for a bricklayer to follow while laying a new course of bricks.

In preferred form, the first cleat is secured to a cleat carrier which is adjustable in position along the first arm. The second cleat is secured to a second cleat carrier which is adjustable in position along the second arm. The cleat carriers may be lengths of tubing which surround the arms. Set screws may be used for securing the cleat carriers to the arms.

In preferred form, the first arm includes a first portion and a second portion which is telescopically received in the first portion. The second arm includes a first portion and a second portion which is telescopically received in the first portion. The first cleat is carried by the second portion of the first arm. The second cleat is carried by the second portion of the second arm. The first means for pulling the first cleat relatively towards the second arm operates to retract the second portion of the second arm into the first portion of the first arm. The second means for pulling the second cleat relatively towards the first arm functions to retract the second portion of the second arm into the first portion of the second arm.

Also in preferred form, the first portion of the first arm has a closed end at the corner end of the first arm. A bolt opening is formed in the closed end. The second portion of the first arm has an adjacent end portion which includes a threaded opening. The first means for pulling the first cleat relatively towards the second arm includes a bolt which extends through the end wall opening and threads into said threaded opening. The bolt includes a bolt head positioned endwise outwardly of the end wall. The bolt is rotated to thread it into the threaded opening to in this manner pull on the second portion of the first arm and pull the first cleat relatively towards the second arm.

The pole socket includes at least one set screw having an inner end in contact with the vertical pole. The set screw is rotatable to move its inner end towards and away from the vertical pole. In preferred form, the pole socket comprises a plurality of set screws which are used for plumbing the pole and also for clamping the pole to the support bracket.

In the preferred embodiment, a pair of the pole support brackets are connected to an outside corner portion of a brick wall that is under construction, in a vertically spaced relationship. Each pole support bracket includes a pair of pole sockets. Each vertical pole extends through a vertically aligned pair of pole sockets. The arms of the connector bracket position the poles outwardly from the outside surface of the brick wall, on both sides of an outside corner. The region of the brick wall at the corner is substantially unobstructed, so that a bricklayer can quickly and easily install bricks at the corner without interference from the string support poles.

Other objects, features and advantages of the invention are hereinafter described in the description of the best mode.

BRIEF DESCRIPTION OF THE DRAWINGS

Like reference numerals are used to designate like parts throughout the several views of the drawing, and:

FIG. 3 is a pictorial view of a support device for a pair of guide line posts, such view being taken from above and looking towards an outside corner of the device;

FIG. 4 is a top plan view of an end portion of one leg of the support device shown in FIG. 3, with the leg and a cleat carrier both shown in longitudinal section;

FIG. 6 is a top plan view of the corner region formed by the intersecting brick wall, presenting a top plan view of the device shown by FIGS. 3 and 5, in its in use position, such view showing portions of the guide string adjacent guide surfaces on the poles and at the upper and left side borders of the views; and FIG. 7 is a fragmentary longitudinal sectional view taken through a corner end portion of one of the legs shown by FIGS. 3 and 5, such view showing an adjustment screw at such end.

BEST MODE FOR CARRYING OUT THE INVENTION

Figure 1:
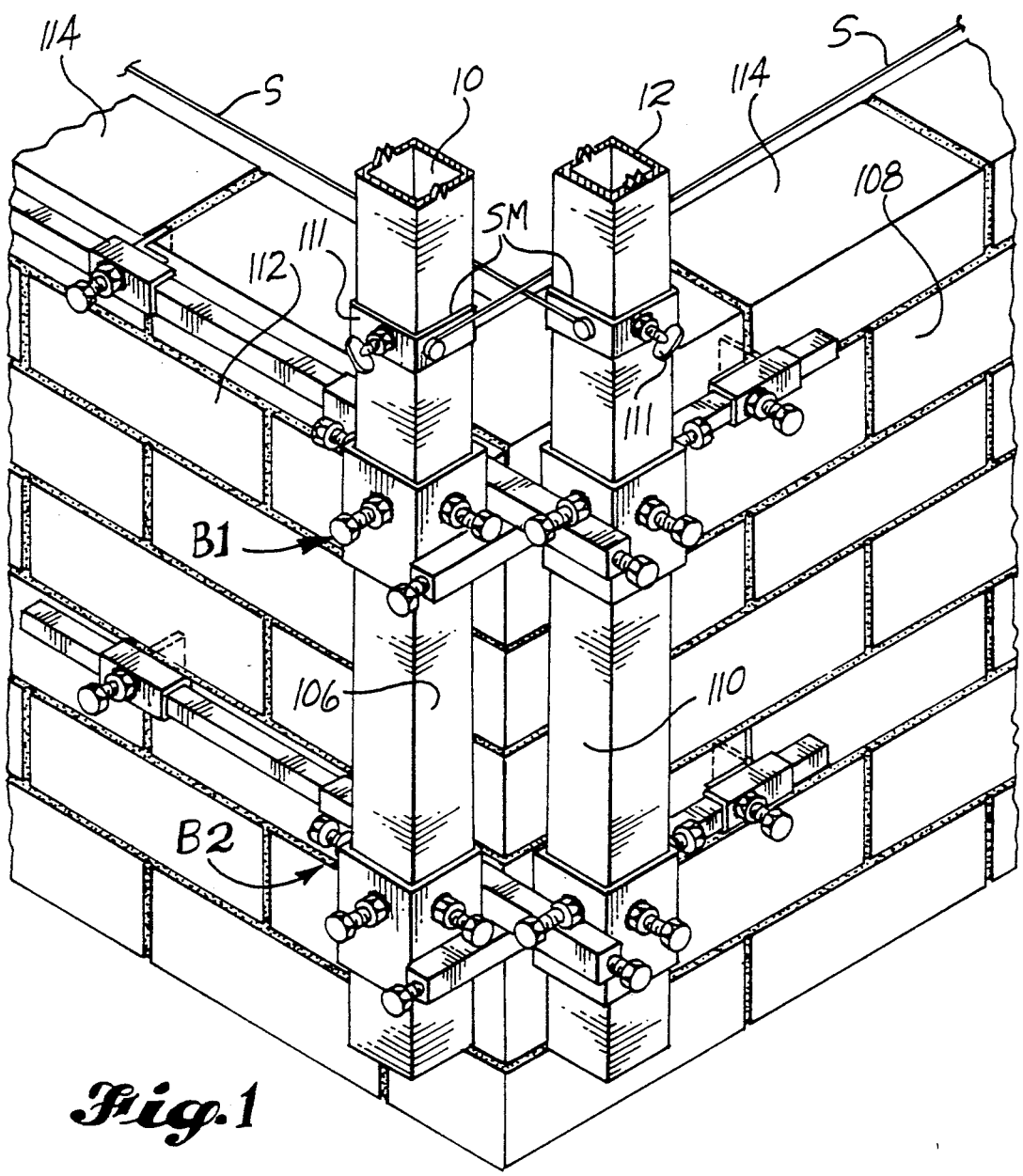
FIG. 1 is a fragmentary pictorial view of two brick walls meeting to form a right angle corner, such view showing guide line posts and post supporting structure at the corner, constructed in accordance with the present invention.

FIG. 1 shows a pair of string poles 10, 12 secured to an outside corner OC of a brick wall BW, by pole support brackets B1, B2. Each pole 10, 12 is paired with another pole (not shown) at another corner of the brick wall BW. By way of example in FIG. 2, pole 12 is shown to be paired with a pole 14 at a second outside corner OC'. A guide string S extends horizontally between the poles 12, 14. The ends of the string S may be secured to slide members SM which are slidable up and down the poles 10, 12. Slide members SM are fixable in position relative to the poles 10, 12. Examples of these slide members SM are disclosed in the aforementioned U.S. Pat. Nos. 3,389,471 and 4,057,903.

Figure 5:
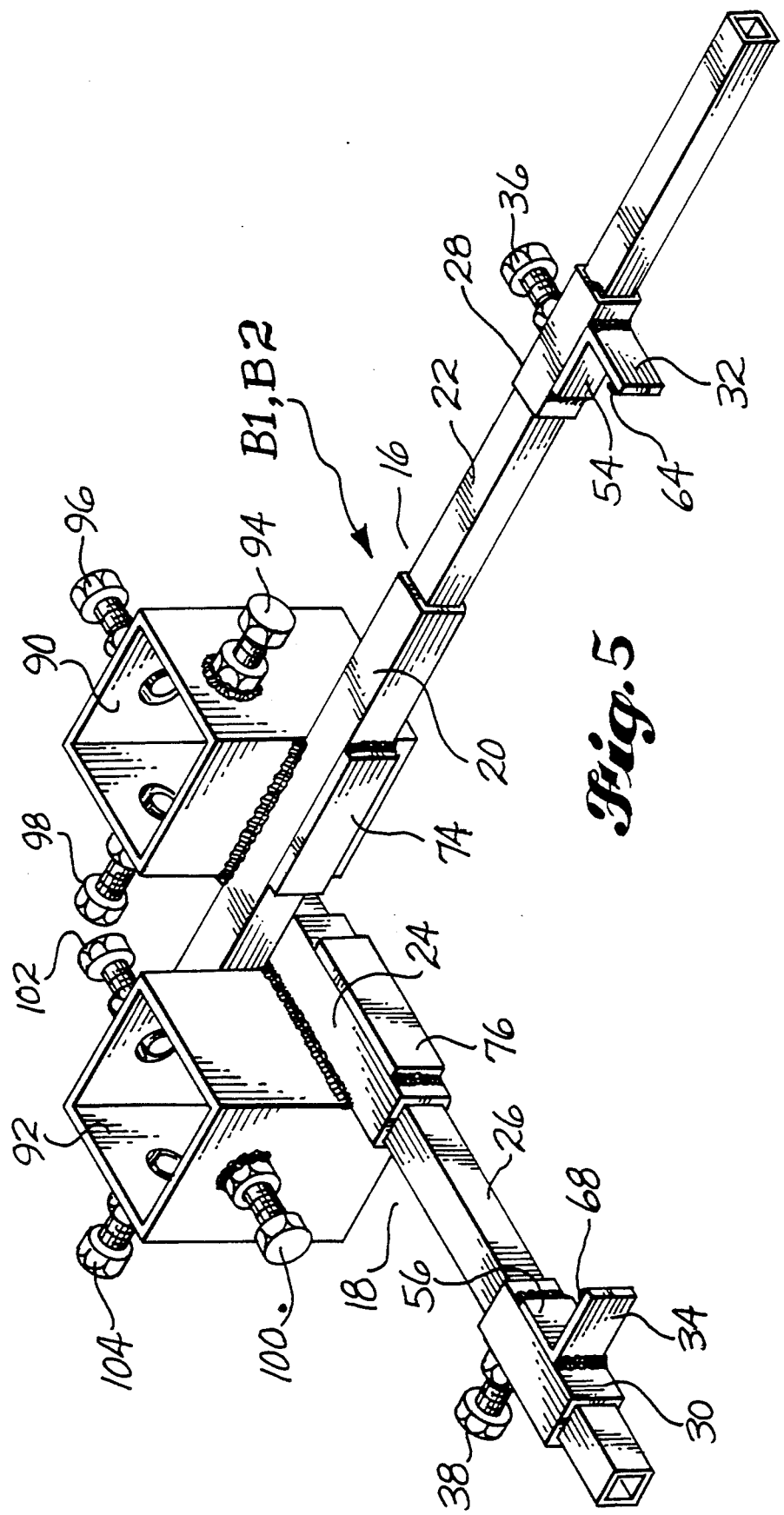
FIG. 5 is a pictorial view taken from above and looking towards the inside corner of the device shown by FIG. 3.

Referring to FIGS. 3 and 5, the brackets B1, B2 are identical. Each includes a first arm 16 and a second arm 18. The first arm 16 includes a first portion 20 and a second portion 22. The second arm 18 includes a first portion 24 and a second portion 26. In preferred form, the arm portions 20, 22 and 24, 26 are tubular members which are telescopically joined. Arm portion 22 is telescopically received within arm portion 20. Arm portion 26 is telescopically received within arm portion 24.

Each arm 16, 18 is provided with a cleat carrier 28, 30 and a cleat 32, 34. Cleat carrier 28 may be a length of tubing which is slidably supported on arm portion 22. In like fashion, cleat carrier 30 may be a length of tubing which is slidably received on arm portion 26. Cleat carrier 28 includes a set screw 36 and cleat carrier 30 includes a set screw 38. A loosening of the set screws 36, 38 will permit a sliding movement of the cleat carriers 28, 30 along the arm portions 22, 26, respectively. A tightening of the set screws 36, 38 will secure the cleat carriers 28, 30 in position relative to the arm portions 22, 24, respectively.

Arm portion 20 is welded or otherwise secured to arm portion 24. Each arm portion 20, 24 extends perpendicular to the other. As a result, each arm 16, 18 extends perpendicular to the other arm 16, 18. Herein the ends of the arms 16, 18 which are connected together are termed the corner ends of the arms 16, 18. The opposite ends of the arms 16, 18 are herein termed the free ends of the arms 16, 18.

FIG. 7 is a longitudinal sectional view of the corner end of arm 16. As shown, arm portion 20 includes an end wall 40 which includes a central opening 42. The corner end of arm portion 22 includes an end wall 44 which includes a threaded opening 46. An adjustment bolt 48 fits through opening 42 and screws into the threaded opening 46. A rotation of the bolt head 50 in a clockwise direction screws the bolt 50 relatively into the threads 46. This causes a retraction of the arm portion 22 into arm portion 20. A reverse rotation of the bolt 48 causes an extension of the arm portion 22. The corner ends of arm portions 24, 26 are constructed in this same manner and an adjustment screw 52 is provided for causing extension and retraction of arm portion 26 out from and into arm portion 24.

The cleats 32, 34 project perpendicularly inwardly from the arms 16, 18. By way of typical and therefore nonlimitive example, the cleats 32, 34 may be constructed from pieces of angle iron. One leg of the angle iron forms the cleats 32, 34. The second leg 54, 56 is welded to the cleat carriers 28, 30, as illustrated.

Referring to FIG. 4, angle iron leg 54 is shown to be welded to carrier tube 28 at 58, 60. On the opposite side of carrier tube 28, a nut 62 is welded to the tube 28. An opening is formed in tube 28 in alignment with the threaded opening in the nut 62. The set screw 36 is a common bolt which is threaded into nut 62.

As also shown in FIG. 4, cleat 32 includes a protuberance 64 which makes contact with an end surface of a brick within a vertical brick joint (FIG. 6). The presence of protuberance 64 spaces the surface 66 of cleat 32 away from the brick. The clamping contact is made between protuberance 64 of cleat 32 and the end wall of the brick at a location spaced inwardly of the brick joint J. This prevents chipping at the outer face of the brick adjacent the joint J. Cleat 34 includes a similar protuberance 68 which serves the same purpose as protuberance 64.

Referring to FIG. 6, the set screws 36, 38 are loosened and the cleat carriers 28, 30 are slid along arm portions 22, 26 until the cleats 32, 34 are aligned with vertical brick joints J when the arm portions 20, 24 are against brick surfaces 70, 72. As best shown in FIG. 5, arm portion 20 includes a pad 74 and arm portion 24 includes a pad 76. The pad 74. 76 are of such a thickness to provide a brick contacting surface which is substantially flush with the surfaces of members 54, 58 (FIG. 6) It is the pads 74, 76 which contact the brick surfaces 70, 72. The bracket B1, B2 is positioned as shown in FIG. 6 and then the set screws 36, 38 are tightened. Next, adjustment screws 50, 52 are rotated to draw the arm portions 22, 26 into the arm portions 20, 24, respectively. This moves the cleats 32, 34 towards the arms 18, 16, respectively. It also clamps brick 78 between cleat 32 and arm 16 and clamps bricks 78, 80 between cleat 32 and arm 18. The adjustment screws 50, 52 are tightened until the bracket B1, B2 is secured to the corner.

Each bracket B1, B2 includes a pair of pole sockets 82, 84. Each pole socket 82, 84 may be constructed from a short length of square tubing. Pole socket 82 is positioned outwardly of arm part 20 and is welded to arm part 20 and to arm part 24. As shown by FIG. 6, arm part 24 has an outer end portion 86 which projects outwardly from arm portion 20. In similar fashion, arm part 20 includes an outer end portion 88 which projects outwardly from arm portion 24. Pole socket 84 is positioned laterally outwardly of arm part 24 and is welded to both arm part 24 and extension 88 of arm part 20. Each pole socket 82, 84 includes a vertical central opening 90, 92 in which a string pole 10, 12 is received. In the illustrated embodiment string pole 12 is located within opening 90 of socket 82. String pole 12 is located within opening 92 of socket 84.

Each socket 82, 84 includes a plurality of set screws. These set screws may be constructed in the same manner as set screws 36, 38. In other words, a nut may be welded to a sidewall location where a set screw is desired, in line with an opening formed in the wall of the socket member 82, 84. Then, a conventional bolt is threaded into the threaded opening of the nut. A tightening of the bolt will cause it to move axially through the nut with its end surface contacting a side surface portion of the associated string pole 10, 12. In preferred form, each clamp 82, 84 is provided with three set screws. The set screws for socket 82 are designated 94, 96, 98. Set screws 94, 98 are positioned in coaxial alignment. They are provided on the sidewalls of socket 82 which are perpendicular to arm 16 and parallel to arm 18. The third set screw 96 is connected to the outside wall of socket 82 which is parallel to arm 16 and perpendicular to arm 18. In similar fashion, set screws 100, 102 for socket 84 are secured to the sidewalls of the socket 84 which extend perpendicular to arm 18 and parallel to arm 16. These set screws 100, 102 are in axial alignment. The third set screw 104 is provided on the outside wall of socket 82 which extends parallel to arm 18 and perpendicular to arm 16.

As shown by FIG. 1, when the two brackets B1, B2 are attached to the corner portion of the brick wall, with bracket B1 spaced above bracket B2, the pole sockets 92, 96 of bracket B1 are in vertical alignment with the pole sockets 92, 96 of bracket B2. Lower end portions of the string poles 10, 12, are positioned within two sockets. Specifically, string pole 10 is positioned within two sockets 82 and string pole 12 is positioned with two sockets 84. The set screws 94, 96, 98 and the set screws 100, 102, 104 have two functions. Firstly, they are used to plumb the string poles 10, 12. Secondly, they are used to clamp the string poles 10, 12 to the brackets B1, B2. String pole 10 is positioned within its sockets 82. Then, the set screws 94, 98 are adjusted to place pole surface 106 in a vertical plane which is to coincide with the outer surface of wall part 108 (FIG. 6). Then, the set screws 96 are tightened to clamp the string pole within the sockets 82. In similar fashion, set screws 100, 102 are adjusted to place side surface 110 of pole 12 in a vertical plane which is to be the plane of the outside surface of wall part 112. Then, set screws 104 are tightened to secure string pole 12 to the brackets B1, B2. String poles are installed at the opposite ends of wall parts 108, 112. Then, the slide members SM are installed on the poles 10, 12 and strings S are attached to the slide members SM. The slide members SM are vertically adjusted in position on the poles 10, 12, either before or after the attachment to them of the string S. As illustrated, slide members SM may be secured to the string poles 10, 12 by means of set screws 111.

Figure 2:
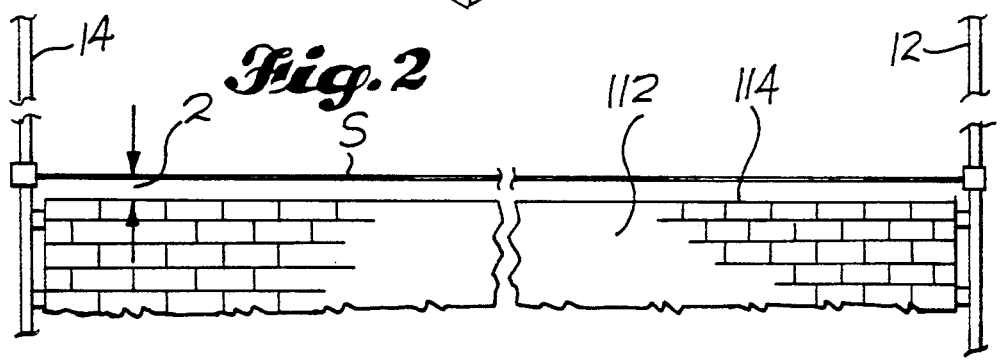
FIG. 2 is a reduced scale, fragmentary side elevational view of a brick wall, showing a guide line extending horizontally between a pair of guide line support posts.

FIG. 2 shows a string S stretched horizontally between pole 12 and a pole 14 at the end of wall part 114 that is opposite the end illustrated in FIG. 1. The string S is put into a horizontal position at a distance 2 above top surface 114 of wall part 112 equal to the combined vertical height of a brick and a brick joint. This enables bricklayers to apply mortar on the top surface 114 and place bricks on the mortar and vertically adjust the bricks until their upper surfaces are at the same level as string S.

The string extending between poles 12, 14 is in tension. It will want to bend the poles 12 14 towards each other. This will cause no problem because such a bending will occur within the outside plane of wall part 112. In similar fashion, the string S attached to pole 10 and its counterpart (not shown) at the opposite end of wall portion 108 will tend to bend the two poles towards each other. This bending will occur within the plane of the outside surface of wall part 108.

As best shown by FIG. 6, the bracket arms 16, 18 are positioned outwardly of the bricks at the outside corner formed where wall parts 108, 112 intersect each other. The string poles 10, 12 are positioned outwardly of the arms 16, 18 and thus are spaced away from the outer surfaces of wall parts 112, 108, respectively. This provides a nearly unobstructed access to the corner region. It allows for easy and quick placement of the bricks at the corner and easy construction of the mortar joint which holds the bricks to each other and to the rest of the wall. The locations where cleats 32, 34 enter into the vertical joints J are unaccessible until the brackets B1, B2 are removed from the wall at the completion of the job. At that time, mortar can be placed into the joints J where the cleats 32, 34 were once located.

The illustrated embodiment is both an example of the invention and the best mode or preferred embodiment. However, the scope of protection is to be determined by the appended claims, interpreted in accordance with the established rules of patent claim interpretation, including use of the doctrine of equivalents.

What is claimed is:

1. Apparatus for facilitating the construction of a brick wall, comprising:

a pole support bracket connectable to an outside corner portion of a brick wall that is under construction, said bracket including:

an elongated first arm including a first portion having a corner end and a second portion having a free end, an elongated second arm including a first portion having a corner end and a second portion having a free end, said first and second arms being connected together at said corner ends and each said arm extending perpendicular to the other arm, a first cleat on the second portion of the first arm, a second cleat on the second portion of the second arm, each said cleat extending perpendicularly inwardly from its arm, each said cleat being sized and positioned to enter into a vertical joint between two bricks when the bracket is positioned with its arms substantially horizontal and against an outside corner portion of the brick wall and with the first arm adjacent an outside surface of the brick wall, first means for pulling the first cleat relatively towards the second arm by retracting the second portion of the first arm, and second means for pulling the second cleat relatively towards the first arm by retracting the second portion of the second arm, to clamp the bracket onto bricks positioned between the arms and cleats at said corner, a vertically oriented pole socket positioned outwardly adjacent the second arm, at its corner end, said pole socket being connected tot he second arm; and an elongated vertical pole positioned within said pole socket, said pole having a side surface which is substantially coplanar with the outside surface of the brick wall, wherein in use a string is placed against said side surface to extend horizontally and serve as a guide for a bricklayer to follow while laying a new course of bricks.

2. Apparatus according to claim 1, comprising a carrier for the first cleat which is adjustable in position along the second portion of the first arm and a carrier for the second cleat which is adjustable in position along the second portion of the second arm.

3. Apparatus for facilitating the construction of a brick wall, comprising:
- a pole support bracket connectable to an outside corner portion of a brick wall that is under construction, said bracket including:
- an elongated first arm having a corner end and a free end,
- an elongated second arm having a corner end and a free end,
- said first and second arms being connected together at their corner ends and each said arm extending perpendicular to the other arm,
- a first cleat on the first arm,
- a second cleat on the second arm,
- each said cleat extending perpendicularly inwardly from its arm,
- said first cleat comprising a carrier which is adjustable in position along the first arm and said second cleat comprising a carrier which is adjustable along the second arm, wherein each carrier is a length of tubing which surrounds a portion of its arm, and each carrier includes a set screw for securing it in position relative to its arm,
- each said cleat being sized and positioned to enter into a vertical joint between two bricks when the pole support bracket is positioned with its arm substantially horizontal and against an outside corner portion of the brick wall and with the first arm adjacent an outside surface of the brick wall,
- first means for pulling the first cleat relatively towards the second arm and second means for pulling the second cleat relatively towards the first arm, to clamp the bracket onto bricks positioned between the arms and cleats at said corner, and
- a vertically oriented pole socket positioned outwardly adjacent the second arm, at its corner end, said pole socket being connected to the second arm; and
- an elongated vertical pole positioned within said pole socket, said pole having a side surface which is substantially coplanar with the outside surface of the brick wall, wherein in use a string is placed against said side surface to extend horizontally and serve as a guide for a bricklayer to follow while laying a new course of bricks.

4. Apparatus for facilitating the construction of a brick wall, comprising:
- a pole support bracket connectable to an outside corner portion of a brick wall that is under construction, said bracket including:
- an elongated first arm having a corner end and a free end,
- an elongated second arm having a corner end and a free end,
- said first and second arms being connected together at their corner ends and each said arm extending perpendicular to the other arm, wherein said first arm includes a first portion and a second portion which is telescopically received in the first portion, and said second arm includes a first portion and a second portion which is telescopically received in the first portion,
- a first cleat on the first arm,
- a second cleat on the second arm,
- each said cleat extending perpendicularly inwardly from its arm,
- each said cleat being sized and positioned to enter into a vertical joint between two bricks when the bracket is positioned with its arms substantially horizontal and against an outside corner portion of the brick wall and with the first arm adjacent an outside surface of the brick wall,
- first means for pulling the first cleat relatively towards the second arm and second means for pulling the second cleat relatively towards the first arm, to clamp the bracket onto bricks positioned between the arms and cleats at said corner,
- wherein the first cleat is carried by the second portion of the first arm and the second cleat is carried by the second portion of the second arm, wherein the first means for pulling the first cleat relatively towards the second arm operates to retract the second portion of the first arm into the first portion of the first arm, and wherein said second means for pulling the second cleat relatively towards the first arm functions to retract the second portion of the second arm into the first portion of the second arm, and
- a vertically oriented pole socket positioned outwardly adjacent the second arm, at its corner end, said pole socket being connected to the second arm; and
- an elongated vertical pole positioned within said pole socket, said pole having a side surface which is substantially coplanar with the outside surface of the brick wall, wherein in use a string is placed against said side surface to extend horizontally and serve as a guide for a bricklayer to follow while laying a new course of bricks.

5. Apparatus according to claim 4, wherein the first portion of the first arm has a closed end at the corner end of the first arm, a bolt opening is formed in said closed end, and the second portion of the first arm has an adjacent end portion which includes a threaded opening, and wherein the first means for pulling the first cleat relatively toward the second arm includes a bolt which extends through said end wall opening and threads into said threaded opening, and which includes a bolt head endwise outwardly of said end wall, whereby the bolt can be rotated to thread it into the threaded opening and pull on the second portion of the first arm, to pull the first cleat relatively towards the second arm.

6. Apparatus for facilitating the construction of a brick wall, comprising:
- a pole support bracket connectable to an outside corner portion of a brick wall that is under construction, said bracket including:
- an elongated first arm having a corner end and a free end,
- an elongated second arm having a corner end and a free end,
- said first and second arms being connected together at their corner ends and each said arm extending perpendicular to the other arm,
- a first cleat on the first arm,
- a second cleat on the second arm,
- each said cleat extending perpendicularly inwardly from its arm,
- each said cleat being sized and positioned to enter into a vertical joint between two bricks when the bracket is positioned with its arm substantially horizontal and against an outside corner portion of the brick wall and with the first arm adjacent an outside surface of the brick wall, first means for pulling the first cleat relatively towards the second arm and second means for pulling the second cleat relatively towards the first arm, to clamp the bracket onto bricks positioned between the arms and cleats at said corner, and a vertically oriented pole socket positioned outwardly adjacent the second arm, at its corner end, said pole socket being connected to the second arm, wherein said pole socket includes at least one set screw having an inner end in contact with the vertical pole, said set screw being rotatable to move its inner end towards and away from the vertical pole; and an elongated vertical pole positioned within said pole socket, said pole having a side surface which is substantially coplanar with the outside surface of the brick wall, wherein in use a string is placed against said side surface to extend horizontally and serve as a guide for a bricklayer to follow while laying a new course of bricks.

7. Apparatus according to claim 6, comprising a set screw positioned to contact said side surface of the vertical pole, a second set screw on the opposite side of the pole socket from the first set screw, and a third set screw positioned between the first and second set screws, on a side of the pole socket opposite the second arm.

8. Apparatus for facilitating the construction of a brick wall, comprising:

a pole support bracket connectable to an outside corner portion of a brick wall that is under construction, said bracket including:

an elongated first arm having a corner end and a free end, an elongated second arm having a corner end and a free end, said first and second arms being connected together at their corner ends and each said arm extending perpendicular to the other arm, a first cleat on the first arm, a second cleat on the second arm, each said cleat extending perpendicularly inwardly from its arm, each said cleat being sized and positioned to enter into a vertical joint between two bricks when the bracket is positioned with its arms substantially horizontal and against an outside corner portion of the brick wall and with the first arm adjacent an outside surface of the brick wall, first means for pulling the first cleat relatively towards the second arm and second means for pulling the second cleat relatively towards the first arm, to clamp the bracket onto bricks positioned between the arms and cleats at said corner, and a first vertically oriented pole socket positioned outwardly adjacent the second arm, at its corner end, said first pole socket being connected to the second arm, and a second vertically oriented pole socket positioned outwardly adjacent the first arm, at its corner end, said second pole socket being connected to the first arm; and a first elongated second vertical pole positioned within said first pole socket, said pole having a side surface which is substantially coplanar with the outside surface of the brick wall, wherein in use a string is placed against said second side surface to extend horizontally and serve as a guide for a bricklayer to follow while laying a new course of bricks, an elongated second vertical pole positioned within said second pole socket, said second pole having a side surface which is substantially coplanar with a second outside surface of the brick wall which extends perpendicular to the first outside surface of the brick wall, wherein in use a string is placed against said second side surface to extend horizontally and serve as a guide for a bricklayer to follow while laying a new course of bricks.

9. Apparatus for facilitating the construction of a brick wall, comprising:

a pair of pole support brackets connectable to an outside corner portion of a brick wall that is under construction, in a vertical spaced relationship, each said bracket including:

an elongated first arm including a first portion having a corner end and a second portion having a free end, an elongated second arm including a first portion having a corner end and a free and a second portion having a free end, said first and second arms being connected together at said corner ends and each said arm extending perpendicular to the other arm, a first cleat on the second portion of the first arm, a second cleat on the second portion of the second arm, each said cleat extending perpendicularly inwardly from its arm, each said cleat being sized and positioned to enter into a vertical joint between two bricks when the pole support bracket is positioned with its arm substantially horizontal and against an outside corner portion of the brick wall and with the first arm adjacent an outside surface of the brick wall, first means for pulling the first cleat relatively towards the second arm be retracting the second portion of the first arm, and second means for pulling the second cleat relatively towards the first arm by retracting the second portion of the second arm, to clamp the bracket onto bricks positioned between the arms and cleats in said corner, and a vertically oriented pole socket positioned outwardly adjacent the second arm of each bracket, at its corner end, each said pole socket connected to the second arm, with the pole socket of one bracket being in vertical alignment with the pole socket of the other bracket; and an elongated vertical pole positioned within said vertically aligned pole sockets, said pole having a side surface which is substantially coplanar with the outside surface of the brick wall, wherein in use a string is placed against said side surface extend horizontally and serve as a guide for a bricklayer to follow while laying a new course of bricks.

10. Apparatus according to claim 9, wherein each bracket includes a carrier for its first cleat which is adjustable and positioned along the second portion of the first arm and a carrier for its second cleat which is adjustable in position along the second portion of the second arm.

11. Apparatus for facilitating the construction of a brick wall, comprising:

a pair of pole support brackets connectable to an outside corner portion of a brick wall that is under construction, in a vertical spaced relationship, each said bracket including:

an elongated first arm having a corner end and a free end, an elongated second arm having a corner end and a free end, said first and second arms being connected together at their corner ends and each said arm extending perpendicular to the other arm, a first cleat on the first arm, a second cleat on the second arm, each said cleat extending perpendicularly inwardly from its arm, each said cleat being sized and positioned to enter into a vertical joint between two bricks when the pole support bracket is positioned with its arm substantially horizontal and against an outside corner portion of the brick wall and with the first arm adjacent an outside surface of the brick wall, first means for pulling the first cleat relatively towards the second arm and second means for pulling the second cleat relatively towards the first arm, to clamp the bracket onto bricks positioned between the arms and cleats in said corner, wherein each bracket includes a carrier for its first cleat which is adjustable and positioned along its first arm and a carrier for its second cleat which is adjustable in position along its second arm, wherein each carrier is a length of tubing which surrounds a portions of its arm, and each carrier includes a set screw for securing it in position relative to its arm, and a vertically oriented pole socket positioned outwardly adjacent the second arm of each bracket, and its corner end, each said pole socket connected to the second arm, with the pole socket of one bracket being in vertical alignment with the pole socket of the other bracket; and an elongated vertical pole positioned within said vertically aligned pole sockets, said pole having a side surface which is substantially coplanar with the outside surface of the brick wall, wherein in use a string is placed against said side surface extend horizontally and serve as a guide for a bricklayer to follow while laying a new course of bricks.

12. Apparatus for facilitating the construction of a brick wall, comprising:

a pair of pole support brackets connectable to an outside corner portion of a brick wall that is under construction, in a vertical spaced relationship, each said bracket including:

an elongated first arm having a corner end and a free end, an elongated second arm having a corner end and a free end, said first and second arms being connected together at their corner ends and each said arm extending perpendicular to the other arm, a first cleat on the first arm, a second cleat on the second arm, each said cleat extending perpendicularly inwardly from its arm, each said cleat being sized and positioned to enter into a vertical joint between two bricks when the pole support bracket is positioned with its arm substantially horizontal and against an outside corner portion of the brick wall and with the first arm adjacent an outside surface of the brick wall, first means for pulling the first cleat relatively towards the second arm and second means for pulling the second cleat relatively towards the first arm, to clamp the bracket onto bricks positioned between the arms and cleats in said corner, and a first vertically oriented pole socket positioned outwardly adjacent the second arm of each bracket, and its corner end, each said pole socket connected to the second arm, with the pole socket of one bracket being in vertical alignment with the pole socket of the other bracket, second vertically oriented pole socket positioned outwardly adjacent it first arm of each bracket, it corner end, each said second pole socket being connected to the first arm, and said second pole socket of each bracket being in vertical alignment with the second pole socket of the second bracket, an elongated first vertical pole positioned within each said vertically aligned pole sockets, said pole having a side surface which is substantially coplanar with the outside surface of the brick wall, wherein in use a string is placed against said side surface to extend horizontally and serve as a guide for a bricklayer to follow while laying a new course of bricks, an elongated second vertical pole positioned within each said vertically aligned second pole socket, said second pole having a side surface which is substantially coplanar with a second outside surface of the brick wall which extends perpendicular to the first outside surface of the brick wall, parallel to the second arms of the brackets, wherein in use a string is placed against said second side surface to extend horizontally and serve as a guide for a bricklayer to follow while laying a new course of bricks.

13. Apparatus according to claim 12, wherein said pole sockets include set screws for vertically aligning the poles and securing the poles in position relative to the pole sockets.

* * * * *

UNITED STATES PATENT AND TRADEMARK OFFICE
CERTIFICATE OF CORRECTION

PATENT NO. : 5,129,150
DATED      : July 14, 1992
INVENTOR(S) : Gerry R. Sorensen It is certified that error appears in the above-identified patent and that said Letters Patent is hereby corrected as shown below:

Column 4, line 32, "74. 76" should be -- 74, 76 --.
Column 4, line 34, there is a period after "(Fig. 6)".
Column 4, line 52, "cuter" should be -- outer --.
Column 5, line 58, "12 14" should be -- 12, 14 --.
Claim 1, column 6, line 55, "tot he" should be -- to the --.
Claim 9, column 10, line 37, "be retracting" should be -- by
   retracting --; and in line 54, insert -- to -- before "extend".
Claim 11, column 11, line 1, delete "end"; and in line 40,
   insert -- to -- before "extend".
Claim 12, column 12, line 24, insert -- a -- before "second"; and
   in line 25, "it", first occurrence, should be -- its -- and
   "it", second occurrence, should be -- at its --.

Signed and Sealed this

Nineteenth Day of October, 1993

Attest:

BRUCE LEHMAN

Attesting Officer        Commissioner of Patents and Trademarks